April 23, 1935.    G. B. NICHOLS    1,998,633
METHOD OF SPLICING TUBES

Filed May 9, 1931

INVENTOR
George B. Nichols
BY
Ely Barrow
ATTORNEYS

Patented Apr. 23, 1935

1,998,633

UNITED STATES PATENT OFFICE 1,998,633

METHOD OF SPLICING TUBES

George B. Nichols, Akron, Ohio, assignor to The Firestone Tire & Rubber Company, Akron, Ohio, a corporation of Ohio Application May 9, 1931, Serial No. 536,219

1 Claim. (Cl. 154—14)

This invention relates to methods of splicing tubes, and more especially it relates to the splicing together of the respective end portions of rubber tires to provide endless tubes, such as inner tubes for pneumatic tire casings. The invention is particularly directed to the splicing of tubes composed of unvulcanized rubber composition.

The chief objects of the invention are to expedite the splicing of rubber tubes; to provide a strong and durable splice therein; and to obviate the use of solvents or adhesives in the splicing of rubber tubes. Other objects will be manifest in the following specification.

Figure 1:
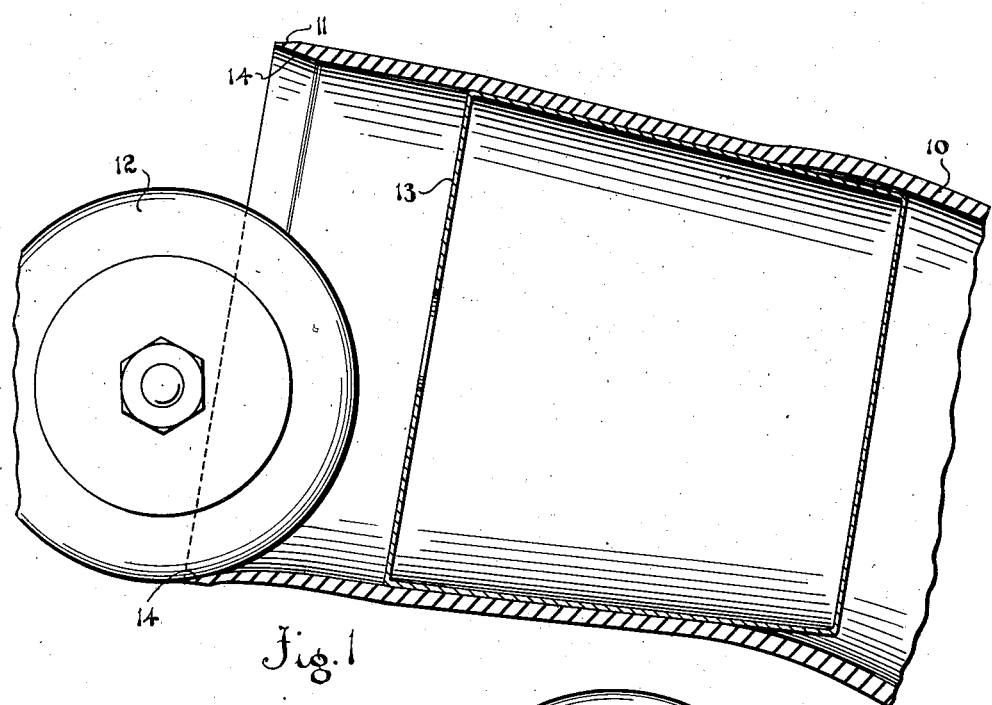
Figure 1 is an elevation of apparatus adapted to carry out one step of the invention, and the work, in section, associated therewith.
Figure 2:
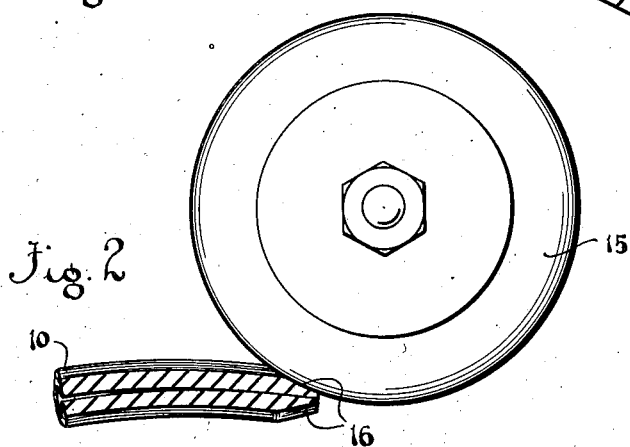
Figure 2 is an elevation of apparatus adapted to carry out another step of the invention, and the work, in section, in operative relation thereto.
Figure 3:
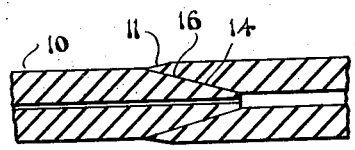
Figure 3 shows the final step of forming the improved tube-splice.

In the manufacture of inner tubes according to this method, there is first provided a tube of unvulcanized rubber composition, which tube may be made by any of the usual or known methods, but preferably is extruded in a continuous strip and thereafter cut into a plurality of shorter lengths which are adapted to have their respective end portions spliced together and to be made into endless inner tubes for tire casings. One end of one of the shorter, individual tubes is shown at 10 in the drawing.

Next, one end of the tube is exteriorly beveled or skived as shown at 11, which operation is effected by any known or preferred skiving apparatus, which usually uses water lubrication to facilitate the cutting of the tube stock. The skive 11 is relatively narrow and does not extend the full thickness of the tube-wall. The skiving operation is not necessary for the production of strong and durable tube splices, but I prefer to use it since it results in a neater and less bulky splice.

The skived end of the tube 10 is then interiorly buffed, as by progressively feeding the tube-end circumferentially past an abrading wheel 12 so that the latter engages the inner surface of the tube, as is shown in Figure 1. Preferably a tapered sleeve or form 13 is mounted within the end portion of the tube during this operation to hold the limp tube structure in cylindrical form. Buffing or abrading of the tube-end tapers or bevels the same as is clearly shown at 14, Figure 1, and also slightly stretches or flares the end, which stretching has been found advantageous in the subsequent splicing operation since it permits the end of the tube easily to be lapped over the opposite end thereof. The buffing operation removes the dusty surface layer of the tube and exposes the tacky underlying unvulcanized rubber structure, the abraded portion presenting a rough, somewhat uneven surface.

The opposite end of the tube is circumferentially buffed exteriorly thereof by feeding it progressively against an abrading wheel 15, with the result that a buffed beveled surface 16 is provided, which surface has the same physical characteristics as the surface 14 of the opposite end of the tube.

The respective ends of the tube are then joined in a lapped splice by inserting the exteriorly-buffed end of the tube into the interiorly buffed end and bringing the buffed surfaces 14, 16 into face to face contact, said surfaces adhering to each other because of the normal tacky consistency of the unvulcanized rubber. A hand roller (not shown) may be used for pressing the tube-ends firmly together at the splice.

The tube subsequently is vulcanized in a mold under heat and pressure in the usual manner, causing the rubber at the splice to coalesce, so that in the finished tube no weakness at the splice is apparent. The feature of the skive 11 assures a smooth exterior surface of the finished tube at the splice.

The method obviates the use of adhesives or solvents in the splicing of rubber tubes, and accomplishes the other objects set out in the foregoing statement of objects.

Modifications may be resorted to within the scope of the appended claim which are not limited wholly to the exact procedure described.

What is claimed is:

The method of splicing unvulcanized rubber tubes which comprises interiorly supporting one end of said tube, interiorly abrading said tube end, exteriorly abrading the other tube end, said abrading operations exposing the tacky underlying stock of said tube ends and forming opposite bevels thereon, and then joining the bevelled portions of said tube ends in a lapped splice.

GEORGE B. NICHOLS.